M. B. FERGUSON.
SEALING AND WRAPPING MACHINE.
APPLICATION FILED APR. 26, 1913.
1,254,895.
Patented Jan. 29, 1918.
5 SHEETS—SHEET 1.
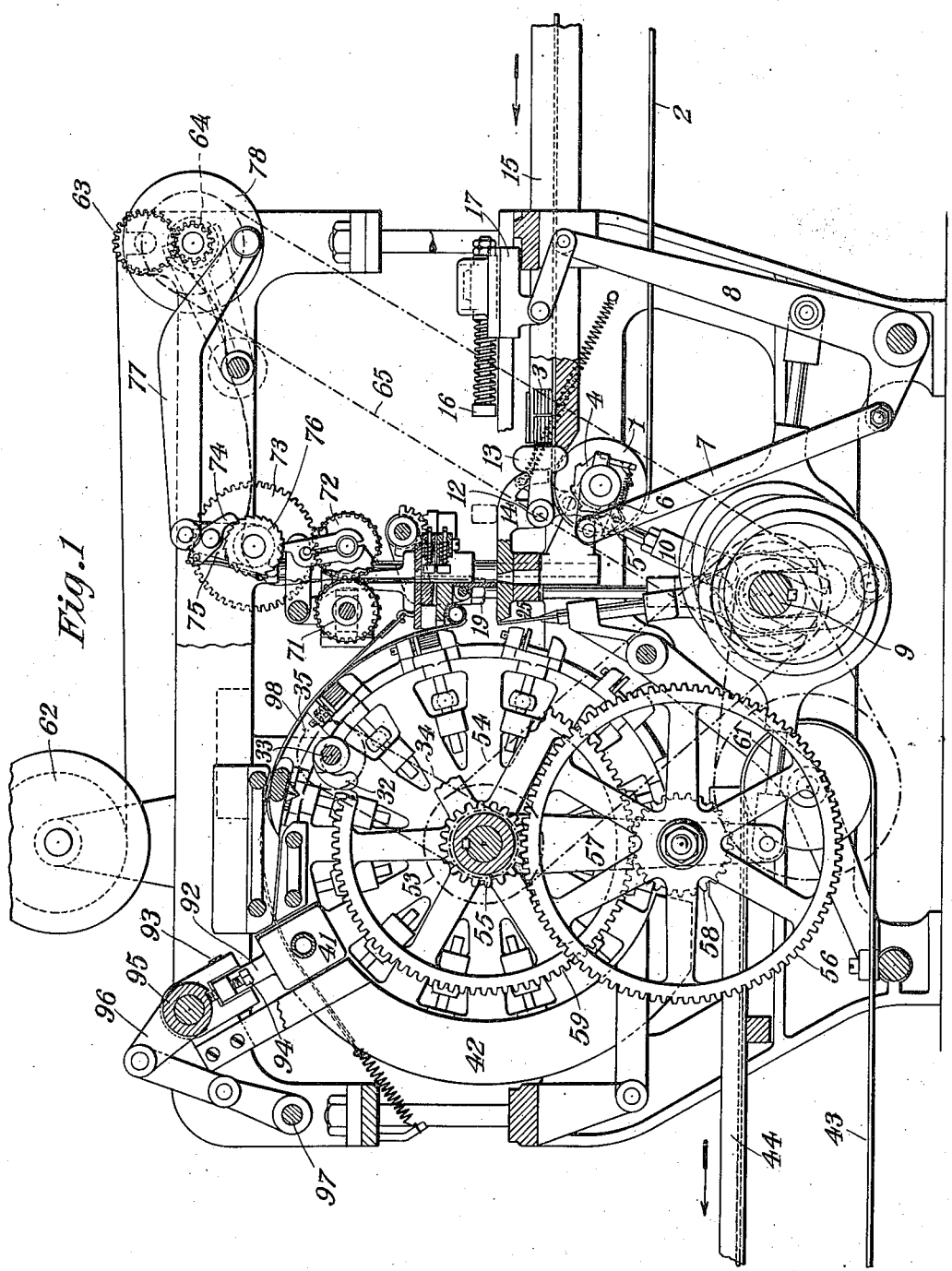

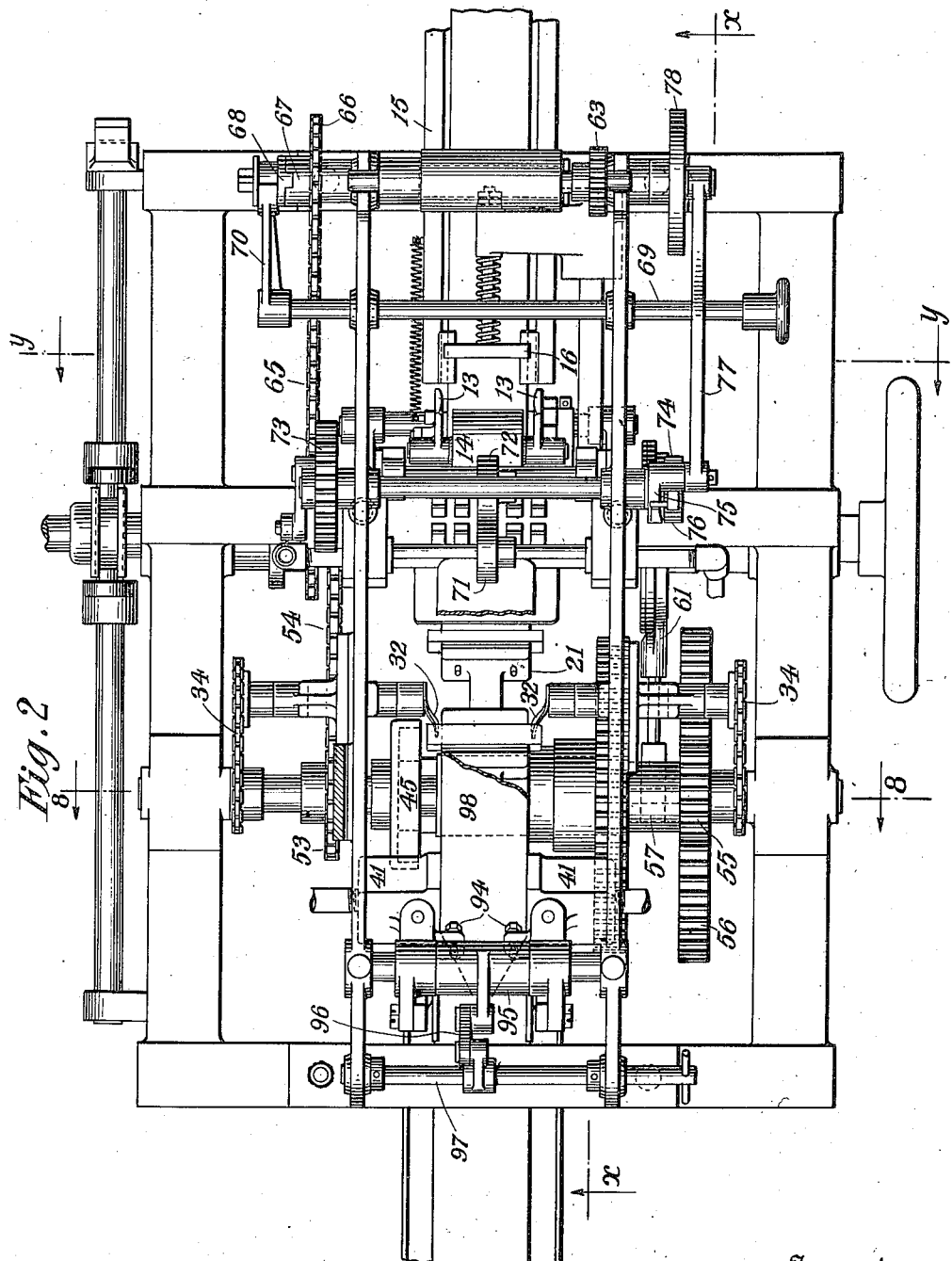

M. B. FERGUSON.
SEALING AND WRAPPING MACHINE.
APPLICATION FILED APR. 26, 1913.
1,254,895.
Patented Jan. 29, 1918.
5 SHEETS—SHEET 3.
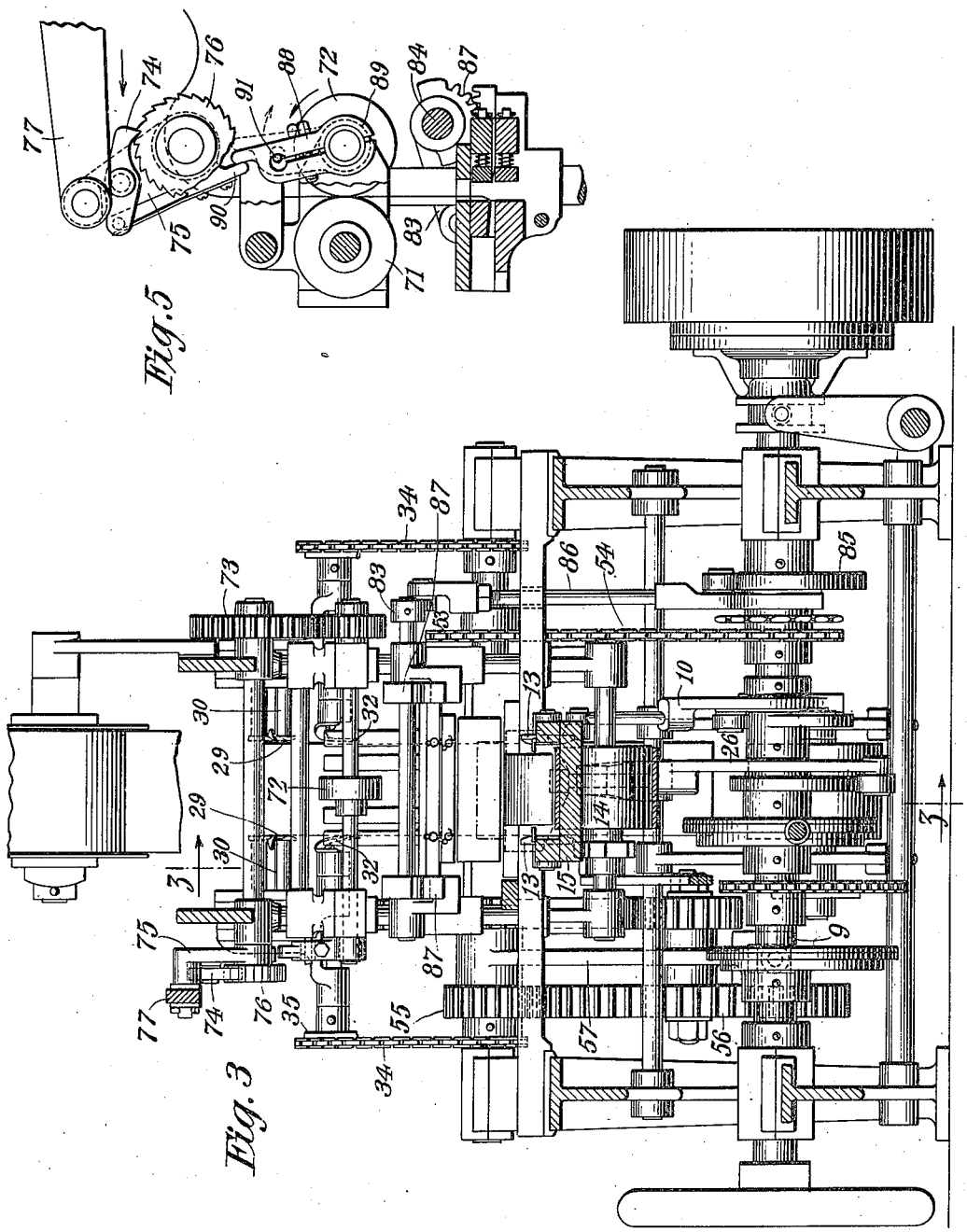

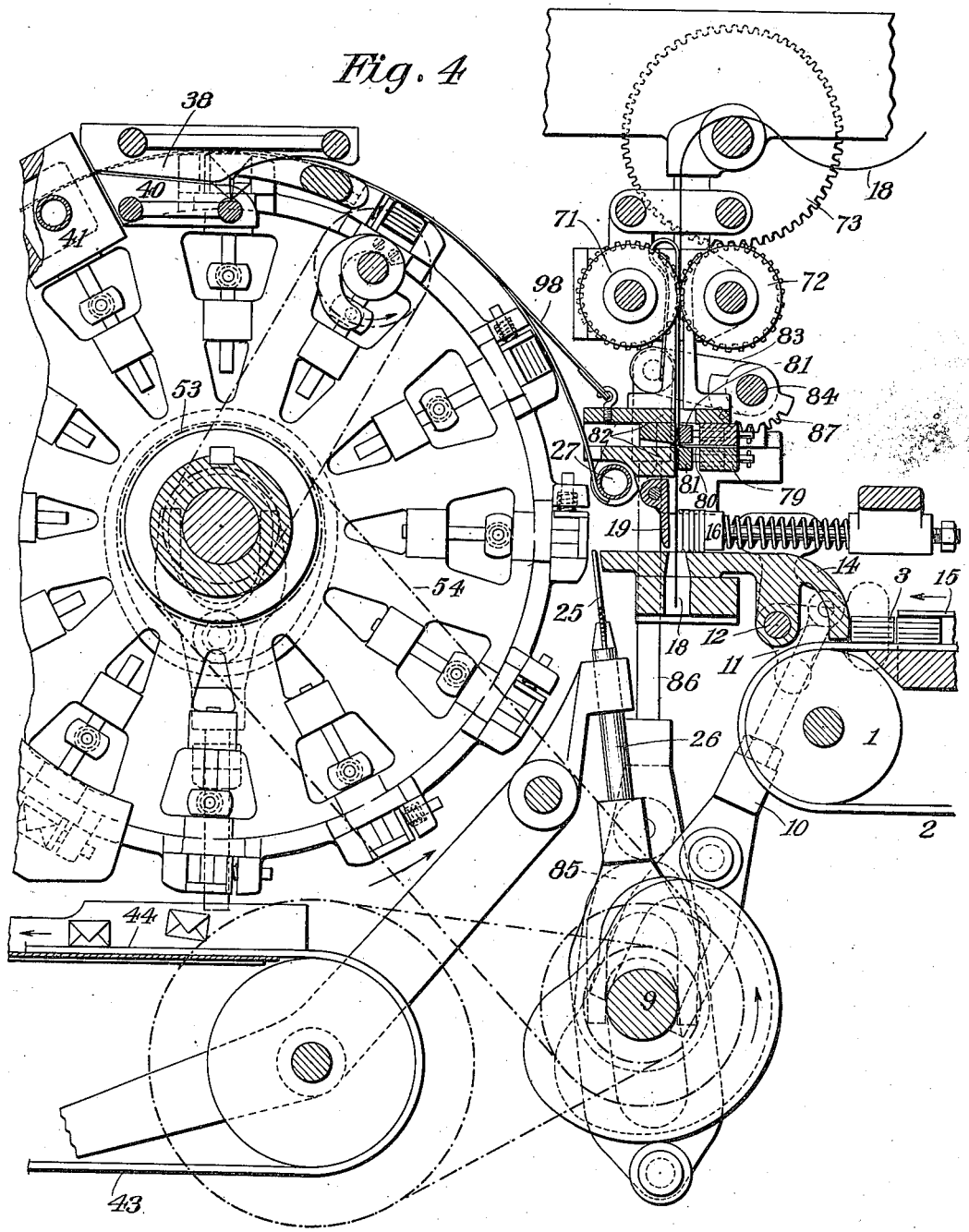

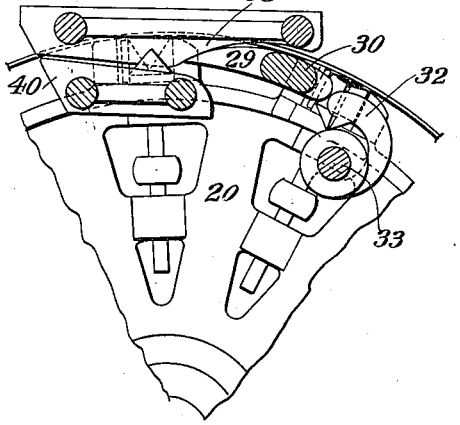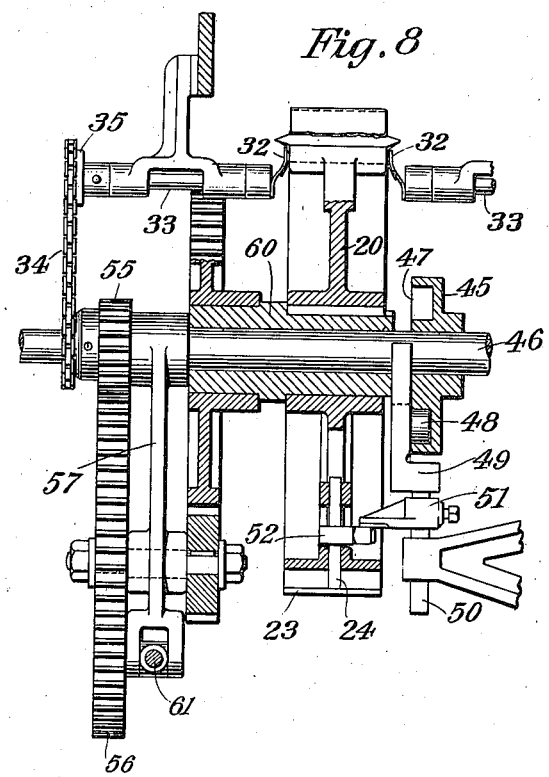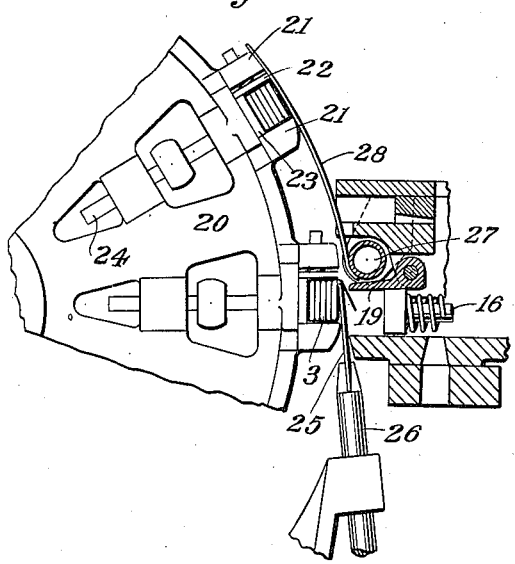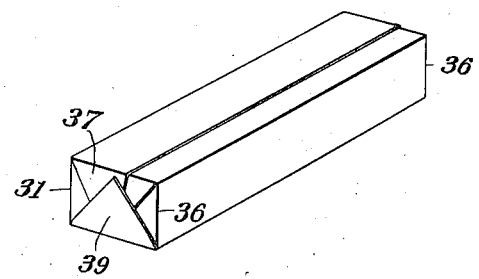

UNITED STATES PATENT OFFICE.

MILFORD BERRIAN FERGUSON, OF BROOKLYN, NEW YORK, ASSIGNOR, BY MESNE ASSIGNMENTS, TO PACKAGE MACHINERY COMPANY, OF BOSTON, MASSACHUSETTS, A CORPORATION OF MASSACHUSETTS.

SEALING AND WRAPPING MACHINE.

1,254,895.  Specification of Letters Patent.  Patented Jan. 29, 1918.

Application filed April 26, 1913. Serial No. 763,903.

*To all whom it may concern:*

Be it known that I, MILFORD B. FERGUSON, residing at Brooklyn, county of Kings, and State of New York, have invented certain new and useful Improvements in Sealing and Wrapping Machines, of which the following is a full, clear, and exact description.

It is necessary in the preparation of a great variety of articles for commercial distribution, to wrap them in paper or similar fabric, impregnated with paraffin or similar material to render it impervious to moisture, and to seal the flaps or overlapping portions of the wrapper to more effectually exclude dust and foreign matter. To accomplish this mechanically and by a single operation I have devised special machines for applying the wrappers and, by the application of heat and pressure, sealing the overlapping portions and flaps of the same, and my present invention is an improvement in apparatus of this class.

The machine in which my present invention is embodied is more particularly designed for wrapping and sealing, in the manner above referred to, packages of chewing gum in the form in which that substance is customarily prepared for the market, and it will be described as adapted and applied for carrying on that operation, but from the nature and purpose of the machine described below, as well as from considerations of the construction and functions of its several elements, it will be perceived by those skilled in the art, that it is generally applicable, without substantial modification, or with only such changes as mechanical skill will readily suggest, to the wrapping and sealing of other articles, largely without regard to their composition or form.

To facilitate an understanding of the machine as a whole, and a recognition of those features of novelty which distinguish it from previous structures for the same or similar purposes, I may state, in general terms, that in carrying out my invention the articles, in this case each consisting of a bundle of a definite number of strips or sticks of chewing gum, are delivered to the machine intermittently by a suitable conveyer, and by mechanical appliances, automatic in their operation, are associated with sections or sheets of waxed or similarly impregnated paper and deposited in receptacles or retainers brought by the operation of the machine successively to the proper point for their introduction therein. While thus retained the lateral edges of the wrappers are caused to overlap and, by the progress of the retainers through the machine, subjected to heat and subsequent pressure to unite them. That is, the overlapping wrapper flaps are heated sufficiently to melt the wax, which they carry, and these flaps are held in contact with each other until the wax cools sufficiently to secure them together. This operation often is referred to, in this art, as "heat sealing"; and a package sealed in this manner often is designated as a "heat sealed package," or a "hot sealed package." By the further progress of said retainers the projecting ends of the wrappers are folded and then united by heat and pressure or in other words are heat sealed together, so that each package is fully sealed, whereupon it is ejected from its retainer on to a suitable conveyer by which it is removed from the machine.

The mechanism by which these steps or operations are effected includes also as features of novelty, improvements in the construction of its elements and the relations of the same in the combinations which they comprise, but as these latter are largely matters of detail they may best be indicated by the claims based upon the description and references to the accompanying drawings which follow.

Figure 1 is a view of the complete machine, partly in section, on the line X—X of Fig. 2.

Fig. 2 is a top plan view of the same.

Fig. 3 is an end view and part section looking from the right on line Y—Y of Fig. 2.

Fig. 4 is a vertical sectional elevation looking from the left on line Z—Z of Fig. 3.

Fig. 5 is an enlarged detail partly in section of the paper feed mechanism.

Figs. 6 and 7 are enlarged details of the mechanism for retaining, folding and sealing the articles or packages.

Fig. 8 is an enlarged detail, partly in section, on the vertical plane of the axis of the turret shaft, and Fig. 9 is a view in perspective of a wrapped and sealed package in the condition in which it is delivered from the machine.

The operative portions of the machine are supported by a suitable frame, the details of which are sufficiently apparent to require no more than passing reference in connection with the description which follows. On this frame is mounted one of a pair of rolls 1 for supporting a conveyer belt 2 by means of which the series of groups or bundles of sticks of gum 3 are brought up to the machine. On the shaft of the roll 1 is a ratchet wheel 4 engaged by a pawl 5 pivoted to a rocker arm 6 which in turn is connected by a link 7 to one arm of a bell-crank lever 8 pivoted to the main frame and oscillated about its bearing by an eccentric on the main drive shaft 9 with which it is properly connected. By this means the conveyer belt is advanced intermittently by steps equal to the width of a package of gum.

A cam on the shaft 9 operates through a suitable connecting rod 10 upon a stud or arm 11 on a rock shaft 12 from which extend two arms or plates 13. The shaft 12 has bearings on the under side of the table or platform 14 the receiving edge of which is bent downwardly as shown in Figs. 1 and 4. The bundles of gum carried on the conveyer belt 2 and advanced intermittently thereby, are directed, by a chute 15, between the arms 13 and the movements of the parts thus far described are so timed, that immediately after a bundle has been embraced by said arms the latter swing upwardly carrying the gum to the upper flat surface of the table or platform 14.

A spring seated plunger 16 is mounted on a block or carriage 17 adapted to be reciprocated by a suitable connection with the longer arm of the bell-crank lever 8 and the movement of said carriage is so timed that as soon as the arms 13, charged with a bundle of gum, have reached a vertical position, the plunger 16 advances and forces the bundle of gum from between said arms and into one of a series of retainers which at that instant by the movement of a turret or rotary support 20 by which it is carried, is in position to receive it.

In passing from the arms 13 across the platform 14 the bundle of gum encounters a sheet of paraffined or waxed paper 18 of predetermined size, (see Fig. 4) and by its further forward movement this paper is folded around three sides of the bundle by the forcible insertion of the latter into the retainer. The size of the sheets of paper is such that their lateral edges will overlap and a sufficient amount of paper extends beyond each end of the bundle and beyond the limits of the retainer to form end flaps which will overlap when folded. To facilitate the operation of associating a bundle of gum with a sheet of paper and to form a guide for the paper in its movement across the path of the gum, a pivoted spring actuated gate 19 normally depends vertically across the path of the plunger and the article which is advanced by it across the table or platform. By the forward movement of the plunger, therefore, the plate or gate 19 is raised and held in a horizontal position, as shown in Fig. 7, until the plunger has been withdrawn from contact therewith. In its normal position the gate forms a guide plate which directs the paper into a slot in the platform.

The retainers above referred to are receptacles or pockets with open ends formed at intervals on the periphery of the rotary support or turret 20, and each is composed of two projections or lugs 21 rigid with the turret. To compensate for slight variations in the dimensions of the articles to be wrapped and in the thickness of the paper wrappers and to insure the proper retention of the same in place, one side of each retainer is formed by a spring seated plate 22 carried by the adjacent rigid projection, and each retainer is provided with a false or movable bottom comprising a plate 23 supported by a plunger or rod 24 suitably mounted in guides in the turret which permit a reciprocating movement in a radial direction.

The movements of the turret are so timed with relation to those of the other parts, that a retainer is directly in the path of an advancing pile or bundle of gum at the instant when the latter is presented by the plunger 16. Immediately upon the complete insertion of the gum together with its wrapper in a retainer, the plunger is withdrawn and a wiper 25 carried by a rod 26 and reciprocated by a cam on shaft 9, is advanced tangentially across the opening of the retainer. This takes up the lower or rear edge or flap of the wrapper projecting from the retainer, as shown in Fig. 7, and folds it over the bundle of gum. The retainer in the meantime, advancing in a counterclockwise direction, travels past a steam-pipe 27 which folds the forward wrapper flap over the rear flap and next passes under a sheet-metal plate 28 in contact with the steam-pipe for the purpose of extending the heating surface thereof. By this means the paraffin or wax carried by the overlapping flaps of the wrapper is melted and after passing beyond the plate 28 the package is moved along in contact with a shield or plate 98 by means of which the two overlapping wrapper flaps are pressed together and sufficiently cooled as the package moves over the metal surface to unite them due to the hardening of the wax.

Traveling under the plate 98 the partially wrapped bundle reaches the point illustrated in Fig. 6. Here the forward sides of the paper wrapper extending beyond the ends of the retainer come between two presser-plates 29 supported by bars 30, and are folded down over the ends of the package along the lines indicated by 31 in Fig. 9. As soon as this fold is effected, flexible folding blades or wipers 32 carried by shafts 33 on opposite sides of the path of the retainers, and driven by chains 34 and sprockets 35 are caused to revolve and wipe the ends of the package so as to fold down the paper from the rear along the lines indicated by 36 in Fig. 9. The folding blades 32 in revolving, pass under the ends of the blades 29.

As the turret continues its movement the upper flaps 37 pass between the upper edges of the plates 29 and the shield 28, until they reach plates 38 supported on opposite sides of the path of the retainers, when they pass between said plates 38 and the plates 39, which are so shaped as to form a downwardly inclined slot by means of which said upper flaps 37 are gradually folded down against the ends of the package of gum. The lower flaps 39 in the meantime pass below the plates 29, but with the completion of the fold of the upper flaps the former pass through upwardly inclined slots between plates 38 and plates 40, by which they are brought up against and over the flaps 37 as shown in Fig. 9.

The folding of the wrappers having been thus completed their ends are thereupon carried between steam heated boxes 41 by which the wax or other material with which the paper is impregnated is fused. After leaving the steam boxes the packages are carried through a sheet metal trough 42 and in contact with the walls of the same whereby the flaps are pressed down, cooled and firmly united or heat sealed together.

After leaving the trough 42 and reaching the lowermost point in their travel, the wrapped and sealed packages are expelled from the retainers and deposited on a conveyer belt 43 by which they are carried through a chute 44 to any desired point. The means for expelling the packages are positive in action and are shown in Fig. 8 as constructed in the following manner. A disk 45 is mounted on the main shaft 46 of the turret and contains a cam groove 47 in its face. Into this groove projects a roller 48 carried by a fork 49 at the end of a stem 50 adapted to reciprocate vertically in suitable bearings. A toe 51 secured to the stem 50 encounters a lug 52 on the rods 24 carrying the false bottoms of the retainers, this operation being so timed that the rod 24 will be actuated and the contents of the retainers expelled at the proper instants.

In the above description the character and timing of the movements has been assumed as proper for the desired operation, and in practice these are matters that may be largely left to the skill and judgment of the constructor. The machine is, however, designed for intermittent movement and in the drawings is so illustrated. For this purpose the main shaft 9 is driven at uniform rate and the intermittent operation of the several mechanisms above described is secured by means of eccentrics or cams in the usual and well understood way. To impart an intermittent movement to the rotary support or turret which carries the retainers, however, I employ the following special devices.

On the turret shaft 46 is fixedly mounted a sprocket wheel 53 which is driven by a chain 54 from the main shaft 9. At the opposite end of said shaft 46 is fixed a pinion 55 which meshes with a spur wheel 56 mounted in bearings on a depending arm 57 pivotally supported by the shaft 46 and turning about the same as a center. The spindle of gear wheel 56 carries a pinion 58 in mesh with a spur wheel 59, Fig. 1, rigid with a loose sleeve 60 mounted on the shaft 46 and carrying the turret 20.

The lower end of the oscillating arm 57 is connected by a rod 61 with the strap of an eccentric on the main shaft 9 and these parts are so related and timed that the rotary movement of the spur gear 59 and sleeve 66 will be alternately retarded and accelerated by the oscillation of the arm 57 and consequent orbital movement of pinion 58 with respect to the wheel 59, so that the latter and with it the turret, will or may be brought to complete rest during intervals of sufficient extent to insert the bundles of gum and to permit the other operations incident to the machine which have been described above.

For the proper operation of the device above set forth I have found certain accessories desirable if not indispensable. Chief among these are the appliances for supplying the paper in sheets of the proper size to the wrappers and means for preventing injury to the machine or to the contents of the retainers in case of stoppage with any of the retainers filled. The first named device is illustrated in Figs. 1, 4 and 5 and will be described by reference thereto.

A long web of paper prepared for use in the machine is carried by a reel 62 mounted in convenient position upon the frame. This web is carried over and between two presser rolls (63, 64) geared together, the shaft of the lower roll 64 being continuously driven by a chain 65 from the main shaft 9 which engages a sprocket 66 on a loose sleeve 67. When the paper feed is in operation, the sleeve 67 is made fast to the shaft of the roll 64 by means of a clutch 68 operated by a push-rod 69 and an arm 70 (see Fig. 2).

The paper, after passing through the feed rolls 63, 64, runs over idlers or guides to the intermittent feed rolls 71 72 which are geared together and receive motion from a spur wheel 73. To this latter, intermittent motion is imparted by a long throw pawl 74, carried by an oscillating arm 75 and engaging a ratchet wheel 76 on the shaft of wheel 73. The arm 75 is rocked by a connecting rod 77 pivoted to its end and eccentrically pivoted at its opposite end to the face of the disk 78 mounted on the shaft of the lower continuous feed roll 64.

From the intermittent feed rolls the paper passes downward through guides across the path of the plunger 16 and through a slot in the platform 14, the devices above described being constructed and arranged in any well understood way to draw the paper continuously from the roll 62, but at the same rate as it is fed intermittently to the devices which associate with it the articles to be wrapped, and said devices are so timed that when the plunger 16 forces an article against the paper, the proper amount for a wrapper has been fed and severed from the web.

The devices for cutting the web, as shown best in Fig. 4, comprise a block 79 adapted to reciprocate horizontally in a suitable frame, and carrying a knife or cutter blade 80 of any suitable kind. On opposite sides of the blade are blocks 81 carried by spring actuated plungers working in the block 79, and which press the web of paper against a face plate 82 containing a slot through which the knife or cutting blade projects when brought up by the forward movement of the block 79.

The said block is reciprocated by a segmental gear 87 engaging a rack bar integral with the block, said gear being intermittently and partially rotated by the movement of an arm 83 pivoted at 84 and oscillated by a cam 85 on shaft 9, through the connecting rod 86.

The sections of paper are severed from the web while the paper is held on opposite sides of the knife by the blocks 81 against the face plate 82, but the severed section is suspended in its proper position by said blocks until taken up by the article to be wrapped. The pressure exerted by the blocks 81, however, while facilitating the desired operation, is liable to cause the paper to adhere to the face plate or to the blocks themselves. The forward movement of the plunger 16 and the article advanced by it is amply sufficient to detach the severed section of paper should the latter adhere to such parts, but to insure the detachment of the ends of the web so that the latter will feed down across the path of the plunger, I have devised the special means shown in Fig. 5.

In this device an arm 88 is frictionally secured by a split sleeve 89 to the shaft of one of the intermittent feed rolls 72. To the arm 75 is secured a lug 90 which engages the end of arm 88 just before reaching the limit of its backward movement, which occurs after a section of paper has been fed, and just before the rolls are rotated by the pawl 76 to effect a further feed. The result of this engagement is to rotate the rolls 71, 72 backward through a small arc by the frictional engagement of arm 88 with the shaft of roll 72. The movement of the arm 88 is limited by a stationary pin 91 entering a hole in the arm, but is sufficient to impart to the web of paper a slight pull that detaches it from the walls of its guide in case it has adhered to the same. By the subsequent rotation of the rolls for feeding the paper, the arm 88 is shifted to its normal position after disengagement with the lug 90.

Should the machine stop for any cause while the retainers are charged with packages of gum, the latter would be liable to be melted by the heat of the steam boxes 41, and to avoid this the said boxes are carried by arms 92 pivoted to the frame at 93 and said arms are bent at right angles and provided with adjustable set screws 94 bearing on the cam surface of a sleeve 95, as shown in Figs. 1 and 2. A movement of partial rotation may be imparted to the cam by a rocker arm 96 linked to a hand rock shaft 97, and when the latter is operated the steam boxes are swung about their pivotal supports away from the path of the retainers.

As above stated, the apparatus may be used for wrapping and sealing articles of many kinds, shapes and sizes, and the invention is limited neither to the special use herein described, nor to those details which are specifically described.

What I claim is:—

1. In a wrapping and sealing machine, the combination with a series of retainers to which articles are successively presented and subjected to the operation of wrapping and sealing mechanisms, of a conveyer for delivering the articles to the machine, means for raising the articles one at a time from the conveyer to a position in alinement with the retainers, and a single reciprocating plunger operative to force said articles one at a time, together with a wrapper sheet into said retainers.

2. The combination with the rotary turret, a series of retainers carried thereby and folding and sealing devices coöperating therewith, of a conveyer for delivering to the machine articles to be wrapped, a table into alinement with the surface of which the retainers are successively moved, means for raising the articles from the conveyer one at a time and depositing them on the table, a plunger for forcing said articles one at a time from said table into the retainers, and means for feeding sheets or sections of paper across the path of the plunger and the article advanced thereby.

3. The combination with a feed table or platform, a series of retainers, movable past the feed table or platform, and a reciprocating plunger for forcing articles, together with a wrapper sheet, successively into said retainers, of a reciprocating wiper movable across the opening of the retainers for folding the lower edge of a wrapper, a stationary heat sealing and folding device by means of which the upper edge of the wrapper is folded and caused to overlap the lower edge, as the retainers advance, and means for folding and heat sealing the ends of the wrappers, coöperating with the retainers during their further movement.

4. The wrapper edge folding and sealing mechanism as a sub-combination of the elements of a machine of the kind described, comprising a rotary support, a retainer carried thereby, a wiper mounted independently of the rotary support and adapted to reciprocate tangentially over the opening of said retainer, and heating and cooling surfaces over which the retainer passes in its advancing movement.

5. In a machine of the character described, the combination with a rotary turret having a series of retainers and folding devices coöperating therewith, of a conveyer for delivering to the machine a series of articles to be wrapped, a table into alinement with which the retainers are moved one at a time, means for grasping the articles on the conveyer by their ends and carrying them one at a time on to said table and additional means for forcing said articles from said table into the retainers.

6. The combination with a rotary support and series of retainers carried thereby, of means for folding the ends of wrapper sheets around articles introduced into said retainers, pivoted heating boxes adjacent to the path of the retainers and on opposite sides thereof, and means for swinging said boxes away from the path of the retainers, for the purpose set forth.

7. In a wrapping machine, the combination with wrapping mechanism, and mechanism for intermittingly feeding a web of waxed or similar prepared paper into position to be associated with an article by said wrapping mechanism, of means for severing said web to form individual wrappers, and means for imparting to said paper feeding mechanism, after each feeding operation, a backward movement of limited extent to detach the paper from surfaces to which it may have adhered.

8. In a wrapping machine the combination with a conveying device carrying a plurality of package retainers, of means for introducing articles into said retainers one at a time with a wrapper impregnated with a readily fusible substance partially folded about each article, means for folding the wrapper about the article to form overlapping folds at the opposite ends of the article, and means for heat sealing together the overlapping folds at said ends, said heat sealing means including heated devices mounted to engage said end folds and means for moving said devices into and out of their operative relationship to said conveying device.

In testimony whereof I affix my signature in the presence of two subscribing witnesses.

MILFORD BERRIAN FERGUSON.

Witnesses:
 HENRY A. BOOTH,
 RALPH H. BOOTH.